June 18, 1963   B. R. SHERMAN ETAL   3,094,164
REFRIGERATED CHEST
Filed July 1, 1960   2 Sheets-Sheet 2

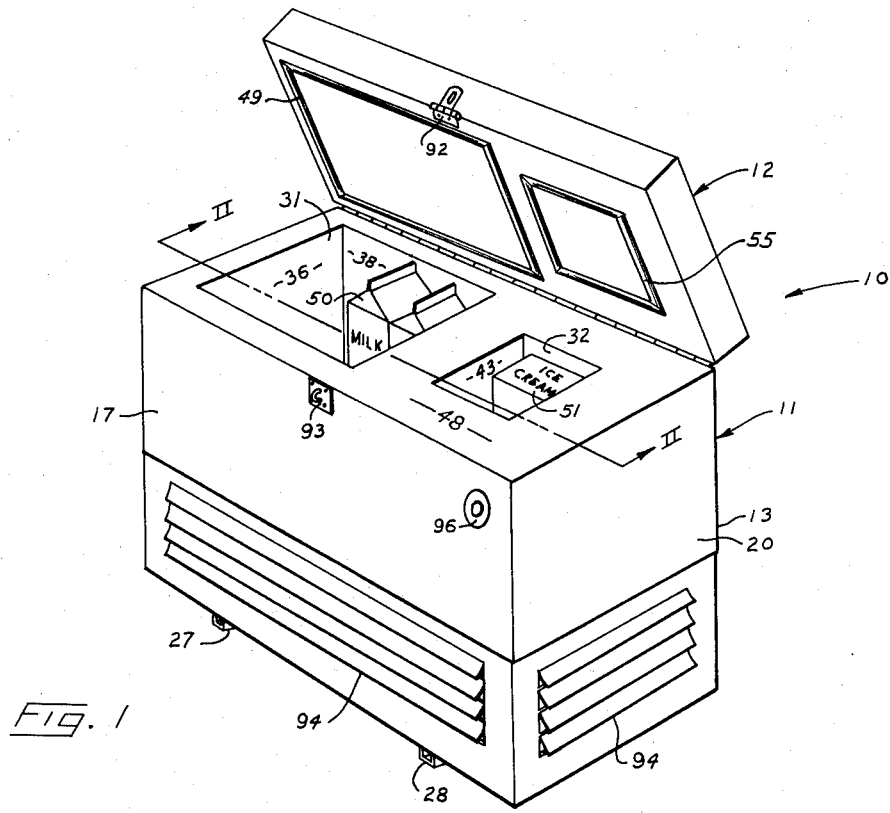
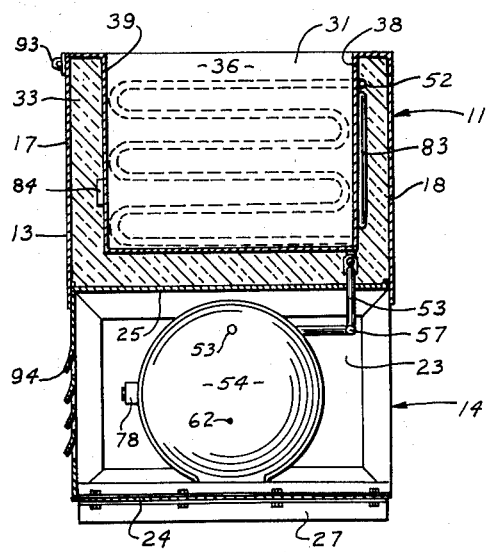

INVENTORS.
BURTON R. SHERMAN
PORTER J. SHERMAN
BY

ATTORNEYS

United States Patent Office 3,094,164
Patented June 18, 1963

3,094,164
REFRIGERATED CHEST
Burton R. Sherman and Porter J. Sherman, both of R.R. 4, South Haven Township, Van Buren County, Mich.
Filed July 1, 1960, Ser. No. 40,203
2 Claims. (Cl. 165—30)

This invention relates in general to a heat insulated chest having chambers in which the temperature can be individually maintained between or below selected limits and, more particularly, to a type of such chest in which perishable food can be placed and protected when it is delivered to a place of use where there is no one present to receive and take care of the food.

Practically any person who has prepared food for consumption has, at some time, experienced the undesirable results of having perishable food delivered to his residence during his absence or preoccupation. In some instances, irreparable spoilage occurs which results in an economic loss and often produces undesirable odors. In other instances, the food may be appropriated by vagrants. Moreover, a prolonged lack of attention for the delivered goods, if visible, is an invitation to burglars.

It is well-known that many attempts have been made to overcome this problem, as by providing special signal devices which can be actuated by the delivering agency to indicate the presence of the goods. In other instances, special openings or entrances have been provided to receive the goods into the building and at the same time to bring them closer to the attention of the intended recipient. Also, efforts have been made to set up routines of delivery which are dependable and, therefore, can be relied upon and planned for. However, none of these procedures has been entirely satisfactory, primarily because most people are either unable or unwilling to restrict their activities so that they will always be present at the time when perishable foods are delivered, regardless of how carefully such delivery is planned.

Although some aspects of this problem are involved in the delivery of all types of perishable foods, they have been particularly apparent in connection with the delivery of milk and milk products, and it was out of a need developed in this field that the instant invention arose. Accordingly, the following descriptive material may, for convenience in illustration, refer to and utilize terms associated with milk products. However, it will be understood that such reference is for illustrative purposes, only, and is not intended to limit the scope of the invention.

The problem of protecting perishable foods, which are not delivered into the hands of the user, has not only existed for many years, but continues to exist. As a result, the demand for the delivery of perishable products has steadily decreased over the years and merchants who deliver such products have found it increasingly difficult to encourage users of their products to accept door-to-door deliveries. The three principal objections to such deliveries (providing the price is competitive) are: (1) the proper amount and types of food are not delivered because no one can be present to order them, (2) losses are sustained because the food, which is delivered during the unavailability of the user, must be left in an unprotected location, and (3) the user's storage space is insufficient to hold an adequate supply of food between deliveries.

If customers have a place in which an adequate supply of food, such as milk, can be stored for several days, and if they are willing to accept larger amounts of such products with each delivery, then the problem of less frequent deliveries can be overcome. However, the problem of timing deliveries with the presence of the receiver of the products will continue to exist and, if anything, become more difficult under existing procedures. For example, where larger amounts of milk products are left when there is no one present to receive them, greater losses can be sustained. Owners of dairies have become acutely aware of this problem and have been attempting for a very long time to find a sound solution.

Accordingly, a principal object of this invention has been the provision of a system whereby deliveries of perishable food, such as milk products, can be made to the place of use when the user is not present, whereby such deliveries can be made in large quantities and thereby reduce the number of trips which are required to a particular place of use, and whereby the perishable food will be completely safe both from misappropriation and from damage by temperature, contamination or otherwise while the recipient of the products is absent and until he needs to use such products.

A further object of this invention has been the provision of a structure having means for controlling the temperature thereof and into which said perishable food can be safely deposited and secured, in the absence of the recipient of such food, by the person delivering same, such structure being capable of protecting the food against excessive heat and excessive cold and, further being capable of completely satisfactory operation and use in an unprotected area, such as out of doors.

A further object of this invention has been the provision of a structure, as aforesaid, which has an automatic mechanism for effecting the temperature control, which is relatively inexpensive to manufacture and maintain, which is pleasant in appearance, which is simple in operation, which occupies a minimum of space and which can be used conveniently both by the delivering agency and the recipient of the products placed therein.

Other objects and purposes of this invention will become apparent to persons familiar with this type of equipment upon reading the following descriptive materials and examining the accompanying drawings, in which:

FIGURE 1 is a perspective view of a food-preserving and protecting structure embodying the invention.

FIGURE 4 is a sectional view taken along the line IV—IV in FIGURE 2.

Figure 2:
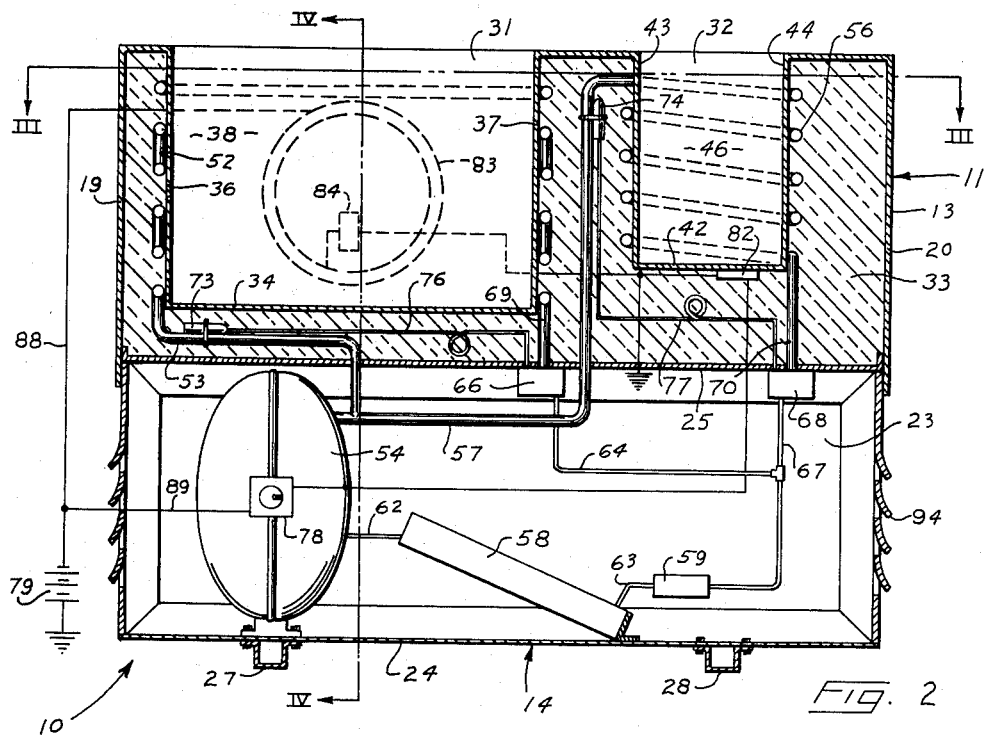
FIGURE 2 is a sectional view taken along the line II—II in FIGURE 1.

For convenience in description, the terms "upper," "lower" and words of similar import will have reference to the structure embodying the invention in its normal position of use, as appearing in FIGURES 1 and 2. The terms "inner," "outer" and derivatives thereof will have reference to the geometrical center of said structure.

*General Description*

The objects and purposes of the invention, including those set forth above, have been met by providing a frame structure supporting a chest having a pair of upwardly opening, insulated receptacles and defining a compartment extending beneath the chest. An insulated closure member is mounted upon the chest for covering said receptacles. A mechanical refrigerating system, which includes a compressor, a condenser, a dehydrator, expansion valves and a source of coolant, is mounted within the lower compartment. Suitable evaporator coils are placed adjacent to the outer surfaces of said receptacles and connected to the above-mentioned parts of the refrigeration system by suitable conduits for the purpose of cooling the zones defined within said receptacles. Appropriate control devices, including a heating element, are also mounted upon and within the structure for the purpose of maintaining selected temperatures within the receptacles.

*Detailed Construction*

The food-preserving structure 10 (FIGURES 1 and 2), is comprised in this particular embodiment of a chest 11 having a cover 12 hingedly supported thereon. The chest 11 includes an outer casing 13, the lower portion of which is secured to and supported upon a rectangular base frame 14 having a plurality of horizontal and vertical frame elements, which may be fabricated from metal and secured to each other by welding. The casing 13 has a front wall 17, a rear wall 18 and a pair of end walls 19 and 20. The lower portions of said walls define a lower compartment 23 having a bottom wall 24 and top wall 25. The base frame 14 is supported upon a pair of skids 27 and 28, which are secured to, and extend crosswise of the bottom wall 24 and the base frame 14.

Figure 3:
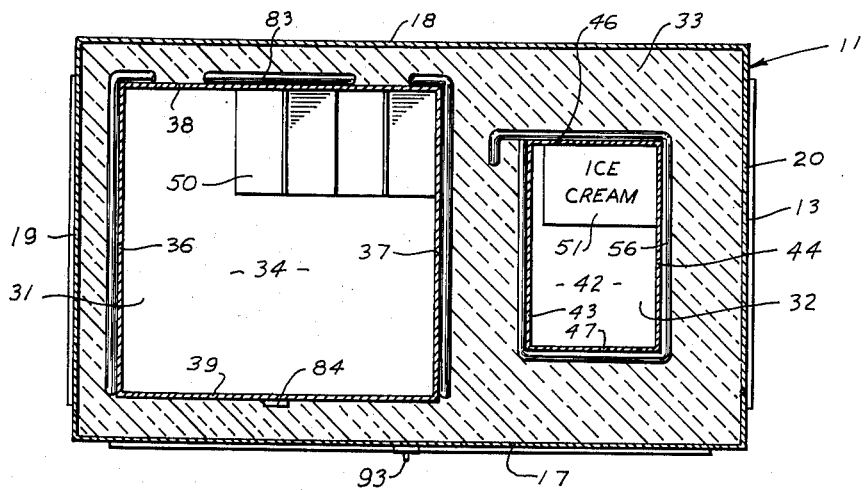
FIGURE 3 is a sectional view taken along the line III—III in FIGURE 2.

A pair of substantially rectangular wells or receptacles 31 and 32 (FIGURES 2 and 3) are disposed within the upper portion of the casing 13 and are spaced from the sidewalls thereof and the horizontal wall 25. Insulation material 33, such as styrofoam, fiberglass or the like, is packed around and against the bottom wall 34, the end walls 36 and 37 and the side walls 38 and 39 of the receptacle 31. Such insulation is also packed around the bottom wall 42, the end walls 43 and 44 and the side walls 46 and 47 of the receptacle 32. The walls of the receptacles may be fabricated from any convenient material, such as sheet metal. The receptacle 31, which is intended to hold containers 50 of milk, is substantially larger in cubic content than the receptacle 32, which is intended to hold frozen products 51, such as ice cream, which are normally used in small quantities. A top plate 48 surrounds the upper open ends of the receptacles 31 and 32, and covers the insulation 33 surounding the receptacles.

Resiliently flexible sealing members or gaskets 49 and 55 are mounted upon the lower surface of the lid 12 and are engageable with the top plate 48 when said cover is in the closed position. The gaskets 49 and 55 are arranged on the lid 12 so that they completely encircle the upper ends of the receptacles 31 and 32, respectively, thereby preventing heat transfer from one to the other or to and from ambient atmosphere. Other existing insulation devices may be used as desired.

An evaporator coil 52 (FIGURES 2 and 3), which is associated with the large receptacle 31, is preferably arranged in two parts located adjacent the outer surfaces of the end walls 36 and 37. The outlet end of the coil 52 is connected by a return conduit 53 to the compressor 54, which provides a supply of coolant in a substantially conventional manner. An evaporator coil 56 completely surrounds the receptacle 32 and its outlet end is connected by the return conduit 57 to said compressor 54.

A condenser 58 (FIGURE 2) is connected between the compressor 54 and a dehydrator 59 by conduits 62 and 63, respectively. A conduit 64 connects the dehydrator 59 to an expansion valve 66, and a further conduit 67 is connected between the conduit 64 and another expansion valve 68. The expansion valves 66 and 68 are in turn connected by the conduits 69 and 70 to the input ends of the evaporator coils 52 and 56, respectively.

The expansion valves 66 and 68 are preferably, but not necessarily, of the pressure-sensitive type in that the amount of fluid permitted by such valves to pass therethrough is dependent upon a pressure-actuable mechanism therein. Control of the pressure impressed upon the expansion valves 66 and 68 is provided by the temperature-sensitive bulbs 73 and 74, respectively, which are connected to the expansion valves 66 and 68 by the tubes 76 and 77. The bulbs 73 and 74 are, in this particular embodiment, attached to the return conduits 53 and 57, respectively, close to the evaporator coils 52 and 56, respectively.

A compressor switch 78 (FIGURE 2), which is mounted upon the compressor 54, is electrically connected between a source 79 of electrical energy and a temperature-sensitive switch 82, which is mounted adjacent the bottom wall 42 of the receptacle 32. Actuation of the compressor switch 78, which causes compressed coolant to move into the condenser 58, is effected only by closure of the temperature switch 82.

The expansion valves 66 and 68, and their associated parts, may be of the type referred to as the "Flica type TM," which is manufactured by Ernst Flitsch, Stuttgart-Fellbach, Germany.

A heating element 83 (FIGURES 2, 3 and 4), which may be of a conventional type, is supported adjacent the side wall 38 of the receptacle 31 and is electrically connected between the electrical source 79 and a temperature-sensitive switch 84, which is mounted adjacent the side wall 39 of the receptacle 31. The source of electrical potential 79 is connected by the conductors 88 and 89 to the heating element 83 and compressor 78, respectively. Accordingly, the heating element 83 is energized by closure of the switch 84. The temperature switches 82 and 84 may be of a conventional type, such as those having a thermocouple sensitive to small temperature changes.

In this particular embodiment, the receptacle 31 is somewhat larger than the receptacle 32 and is particularly designed for receiving and storing a selected number of half gallons, quarts or other units of milk in containers 50. The receptacle 32 is designed for receiving units of frozen products such as cartons 51 of ice cream.

The front, free edge of the cover 12 and the adjacent upper edge of the front wall 17 have cooperating latch parts 92 and 93 whereby a conventional lock can be connected to these members for preventing unauthorized entry into the chest 11. The lower portions of the front and end walls 17, 19 and 20, respectively, can be provided with vents 94 whereby air can move freely through the compartment 23 while the working parts therein are protected from the elements.

*Operation*

Installation of the food-preserving structure 10 is effected by placing the chest 11 where desired, either inside or outside of a building. For obvious reasons, it is advantageous to place the chest 11 in a sheltered or covered location, if it is to be installed on the outside of a building, such as a residence. For example, the chest 11 could be advantageously placed in a breezeway, in an unused portion of an attached garage, in a covered porch or the like, where it occupies very little space. The conductors 88 and 89 are connected to the electrical source which, under normal circumstances, will be the electrical system of the building.

If the ambient temperature is above freezing, the temperature-sensitive switch 82 will normally be closed and, therefore, connection of the conductors 88 and 89 to the electrical source 79 will immediately start the operation of the compressor 54. That is, the switch 82 will normally be set so that it will be closed at any temperature above a selected temperature which will insure a freezing condition within the receptacle 32. Ordinarily, this selected temperature will be below zero degrees F. The expansion valve 68 is set so that it will pass coolant to the evaporator coil 56 whenever the temperature of the bulb 74, which is attached to the return conduit 57, rises above a predetermined value, which corresponds to a temperature above the desired temperature in the receptacle 32.

In a similar manner, the expansion valve 66 meters coolant into the evaporator coil 52 so that the supply of coolant to the evaporator coils 52 and 56 is independently controlled in response to the demands of the heat load in the particular receptacle. The compressor switch 78 may be of a type which is responsive to the back pressure from the condenser 58, which will occur when both expansion valves 66 and 68 are closed.

The heating element 83 is provided for the purpose of maintaining a minimum temperature, normally from 32 degrees to 35 degrees F., in the receptacle 31, in order to prevent freezing therein. The temperature-sensitive switch 84 provides the control for energizing the heating element 83. Accordingly, the operation of the expansion valve 66 in response to a signal from the temperature bulb 73 will normally be set so that the temperature within the receptacle 31 will not be lowered by the evaporation coil 52 to the point where it will close the switch 84. For example, the expansion valve 66 may be set so that it is closed when the temperature in the receptacle 31 reaches a low value of between 38 and 40 degrees F., thereby giving a temperature spread of at least 3° between the point at which the expansion valve 66 closes and the temperature at which the switch 84 will close.

By means of the above-described controls, the milk in the containers 50 can be maintained at a selected temperature which will keep the milk fresh and wholesome for long periods of time regardless of the variations in the ambient temperature. At the same time, ice cream and other similar types of frozen products can be kept in a completely frozen condition in the receptacle 32. The chest 11 can be easily opened by a deliveryman at any time and its contents will be quickly available to the receiver of the milk products (but to no others) at the receiver's convenience. Moreover, the adequate storage space in the chest will augment the normal refrigerator storage of the user and eliminate a further problem often encountered by residence owners having insufficient space to store an adequate supply of milk products, particularly when they have just returned from the food market with a week's supply of other perishable foods. It will also follow that the same chest can be made available for many other food products, such as frozen desserts, which can be delivered as easily by the milkman as they can be purchased at a food market and thereby reduce the amount of carrying which the user must perform.

A suitable indicator light 96 may be mounted upon the outside of the chest 11 and connected to the electrical system of the structure in a conventional manner to indicate that the refrigeration system is operating.

Although a particular, preferred embodiment of the invention has been disclosed above in detail, it will be recognized and understood that variations or modifications of such disclosure, which lie within the scope of the appended claims, are fully contemplated.

What is claimed is:

1. A structure for controlling the temperature of perishable foods, comprising: a structure having wall means defining first and second, upwardly opening receptacles in side-by-side arrangement and a compartment beneath said receptacles, the wall means defining said compartment having perforations through which air can flow into and out of said compartment; closure means on said structure for covering the openings in said receptacles; insulation means surrounding the external surfaces of said receptacles and further insulation means disposed within said closure means; two sets of evaporator coils adjacent portions of the outer surfaces of said receptacles, the number of coils per unit of surface being greater with the second receptacle than with the first receptacle; a motor-driven compressor for supplying coolant under pressure; a condenser, said compressor and said condenser being disposed within said compartment; output conduit means connecting said condenser in series with said compressor, a pair of pressure sensitive, expansion valves and conduits connecting each of said valves between said condenser and one of said sets of coils, whereby the flow of coolant from said source to said sets of coils is independently controlled; a pair of return conduit means respectively connecting said coils to said compressor, one coil and one valve being in parallel with the other coil and the other valve between said condenser and said compressor; a pair of temperature-sensitive means in contact with and responsive to temperature changes in each of said return conduit means and operatively connected to said expansion valves for applying control pressure thereto; a first temperature-sensitive device adjacent said second receptacle and operatively connected to said compressor for controlling the operation thereof; an electrical heating element adjacent said first receptacle; a source of electrical energy and a second temperature-sensitive device adjacent said first receptacle and operatively connected to said heating element for connecting same to said electrical source, whereby the temperature within said first receptacle can be held between selected limits and the temperature within said second receptacle can be held below a selected limit.

2. The structure of claim 1 wherein said first receptacle is substantially larger than said second receptacle and the first receptacle is substantially rectangular in shape; and wherein the set of evaporator coils associated with said first receptacle is comprised of two sections disposed upon opposite sides thereof, the heating element is adjacent the third side of said first receptacle and said second temperature-sensitive device is located adjacent the fourth side of said receptacle.

References Cited in the file of this patent
UNITED STATES PATENTS

| | | |
|---|---|---|
| 1,979,222 | Goodwin | Oct. 30, 1934 |
| 2,191,925 | Kaufman | Feb. 27, 1940 |
| 2,328,810 | Johnson | Sept. 7, 1943 |
| 2,462,240 | Van Vliet et al. | Feb. 22, 1949 |
| 2,488,161 | Benson et al. | Nov. 15, 1949 |
| 2,672,023 | Jacobs et al. | Mar. 16, 1954 |
| 2,724,577 | Murphy | Nov. 22, 1955 |
| 2,780,441 | Rhodes | Feb. 5, 1957 |